(12) United States Patent
Gil

(10) Patent No.: US 12,185,719 B2
(45) Date of Patent: Jan. 7, 2025

(54) MIXTURE OF A FOLCYSTEINE-BASED BIOSTIMULANT AND AN AGROTOXIC SUBSTANCE OF INTEREST RESULTING IN A QUANTITATIVELY, QUALITATIVELY AND TIME-RELATED RESULT-POTENTIATING ACTION AS OBSERVED IN AN AGRICULTURAL CROP OF A PLANT OF INTEREST

(71) Applicant: UPL Corporation Limited, Port Louis (MU)

(72) Inventor: Gustavo Yepez Gil, Sao Paulo (BR)

(73) Assignee: UPL CORPORATION LIMITED, Port Louis (MU)

( * ) Notice: Subject to any disclaimer, the term of this patent is extended or adjusted under 35 U.S.C. 154(b) by 256 days.

(21) Appl. No.: 17/750,623

(22) Filed: May 23, 2022

(65) Prior Publication Data

US 2022/0279784 A1  Sep. 8, 2022

Related U.S. Application Data

(62) Division of application No. 16/643,998, filed as application No. PCT/BR2018/050323 on May 9, 2018, now Pat. No. 11,388,900.

(30) Foreign Application Priority Data

Sep. 6, 2017  (BR) .......................... 1020170191206

(51) Int. Cl.
| | |
|---|---|
| A01N 25/32 | (2006.01) |
| A01N 25/02 | (2006.01) |
| A01N 25/08 | (2006.01) |
| A01N 25/24 | (2006.01) |
| A01N 25/30 | (2006.01) |
| A01N 41/06 | (2006.01) |
| A01N 43/40 | (2006.01) |
| A01N 43/56 | (2006.01) |
| A01N 43/90 | (2006.01) |
| A01N 57/20 | (2006.01) |

(52) U.S. Cl.
CPC ............. *A01N 25/32* (2013.01); *A01N 25/02* (2013.01); *A01N 25/08* (2013.01); *A01N 25/24* (2013.01); *A01N 25/30* (2013.01); *A01N 41/06* (2013.01); *A01N 43/40* (2013.01); *A01N 43/56* (2013.01); *A01N 57/20* (2013.01); *A01N 43/90* (2013.01)

(58) Field of Classification Search
CPC ........ A01N 25/32; A01N 25/02; A01N 25/08; A01N 25/24; A01N 25/30; A01N 41/06; A01N 43/40; A01N 43/56; A01N 57/20; A01N 43/90
See application file for complete search history.

(56) References Cited

U.S. PATENT DOCUMENTS

| | | | |
|---|---|---|---|
| 5,925,367 | A | 7/1999 | Angst et al. |
| 2010/0285959 | A1 | 11/2010 | Armel et al. |
| 2015/0126369 | A1 | 5/2015 | Bristow |
| 2015/0377762 | A1 | 12/2015 | Takenaka et al. |
| 2017/0223961 | A1 | 8/2017 | Nogueira et al. |
| 2020/0337305 | A1 | 10/2020 | Gil |

FOREIGN PATENT DOCUMENTS

| | | |
|---|---|---|
| CN | 104222157 A | 12/2014 |
| CN | 104542669 A | 4/2015 |
| CN | 107047609 A | 8/2017 |
| EP | 1719409 A1 | 11/2006 |
| JP | S61100504 A | 5/1986 |
| WO | 2009153231 A2 | 12/2009 |
| WO | 2010081645 A2 | 7/2010 |
| WO | 2010106314 A2 | 9/2010 |
| WO | 2015153281 A1 | 10/2015 |
| WO | 2016081768 A1 | 5/2016 |
| WO | 2019046921 A1 | 3/2019 |

OTHER PUBLICATIONS

Anonymous; "Acaricides" [Datasheet]; Agricultural Chemicals (M) Sdn.Bhd.; 2018; 3 pages.
Anonymous; "Foltron Enriched Liquid Leaf Fertilizer" [Datasheet]; Arysta Lifescience; 2013; 2 pages.
Anonymous; "Foltron Plus" [Datasheet]; Arysta Lifescience (revised Feb. 27, 2015); 2015; 8 pages.
International Search Report and Written Opinion for International Publication PCT/BR2018/050323; International Filing Date: Sep. 6, 2017; Date of Mailing: Sep. 25, 2018; 11 pages.
Morales-Payan, J. et al.; "Influence of the biostimulant folcysteine on the interference of purple nutsedge (*Cyperus rotundus* L.) with eggplant (*Solanum melongena* L.)"; Proceedings of the Florida State Horticultural Society, vol. 114; 2001; pp. 275-277.
Moss, F. et al.; "Photochemical Activity and Agronomic Behavior of Soybeans Due to the Reduction of Phytotoxicity-Reduced Stress"; Presented at the 3rd Week of Knowledge, University of Passo Fundo; 2016; 3 pages.
Santinato, R. et al.; "Control of Main Coffee Diseases with the Arysta Phytosanitary Program"; Persented to the Brazilian Coffee Research Congress, vol. 41; 2015; 2 pages.
Calvo, P. et al.; "Agricultural uses of plant biostimulants"; Plant Soil, vol. 383; 2014; pp. 3-41; DOI: 10.1007/s11104-014-2131-8.
International Search Report and Written Opinion for International Application PCT/IB2021/057978; International Filing Date: Sep. 1, 2021; Date of Mailing: Nov. 16, 2021; 14 pages.

(Continued)

*Primary Examiner* — Trevor Love
(74) *Attorney, Agent, or Firm* — CANTOR COLBURN LLP

(57) ABSTRACT

Described herein is a blend including folcysteine and a component Y which is a fungicide, an herbicide, a fungicide plus an herbicide, or an insecticide, the blend characterized by the formula B=(X)+(Y), wherein: B represents the blend; X represents the folcysteine in a concentration ranging from 0.50 to 2,000 g ai/ha, and Y2 represents the fungicide, herbicide, fungicide plus herbicide, or insecticide.

8 Claims, No Drawings

(56) References Cited

OTHER PUBLICATIONS

D.S. Conceicao, et al. "Photochemical and photocatalytic evaluation of 1D titanate/TiO2 based nanomaterials," Applied Surface Science, vol. 392, Jan. 15, 2017, pp. 418-429.

Moss, Felipe "Photochemical activity and agronomic behavior of soybean as a function of phytotoxicity stress reduction," University of Passo Fundo (2016) 3 pages.

Santinato, R. "Control of the Main Diseases of Coffee Plants with the Arysta Phytosanitary Program," 2 pages.

MIXTURE OF A FOLCYSTEINE-BASED BIOSTIMULANT AND AN AGROTOXIC SUBSTANCE OF INTEREST RESULTING IN A QUANTITATIVELY, QUALITATIVELY AND TIME-RELATED RESULT-POTENTIATING ACTION AS OBSERVED IN AN AGRICULTURAL CROP OF A PLANT OF INTEREST

CROSS REFERENCE TO RELATED APPLICATIONS

This application is a Divisional of U.S. application Ser. No. 16/643,998, filed on Mar. 3, 2020, which is a National Stage application of PCT/BR2018/050323, filed on Sep. 5, 2018, which claims the benefit of BR Application No. 10 2017 019120 6, filed on Sep. 6, 2017, both of which are incorporated by reference in their entirety herein.

DETAILED DESCRIPTION

Terminology

To better understand the disclosed matter and the claims of this patent application, the significance of some of the terms used in the body of the descriptive report are provided below:

Synergy: in general, synergy may be defined as a combination of two elements such that the result of the combination is larger than the sum of the individual results of each element. Thus, synergy is nothing more than a sum of factors focused on the same purpose.

Blend: a blend is made up of two or more simple or compound substances. A blend may be solid or liquid, homogeneous or not.

Homogeneous blend: is a blend of substances whereby, as a result of the blend, the substances can no longer be identified in isolation, as they could at the start. The appearance of a homogeneous blend is uniform to the naked eye, blends are also single-phase.

Plants: includes germinating seeds, saplings, emerging seedlings and established vegetation, including roots and sections above the soil such as leaves, stems, flowers, fruits, branches, members, roots and the like.

Low vegetation: members of the grass family, growing spontaneously or planted in fields and used as forage; also cultivated in gardens, parks, pastures and lawns.

Lawn: ground cover consisting of a superficial layer of grass and grass roots.

Plant of agricultural interest: is any type of edible or inedible plant to be used for commercial consumption; these may be, trees, floral or non-floral plants, grasses, lawns and the like.

Commodity: is a term used primarily with reference to products in their raw state (raw materials) or slightly processed, of quasi-uniform quality, manufactured in large amounts by different producers. Depending on how they are stored, these products may be stored for a finite period of time in natura without significant loss of quality, and are quoted and traded worldwide via commodity exchanges. For the purposes of the present invention, the plant of agricultural interest is a commodity.

Biostimulants: are substances applied to plants to increase nutritional efficiency, increase resistance to stress due to biotic or abiotic factors, increase productivity and/or improve the quality of the commodity.

Growth regulators: are substances comprised of hormones that, when applied to a plant, act on different plant physiological and metabolic processes.

Biotic factors: may be understood as the sum of all effects caused by organisms in an ecosystem, which condition the populations that make up the ecosystem.

Abiotic factors: may be understood as the sum of all influences live beings in an ecosystem may receive from physical, chemical or physical-chemical aspects in the environment, such as light, solar radiation, temperature, time, water, soil composition and pressure, among others.

Folcysteine: is an aminoacid derivative that has the property of promoting biochemical reactions that help prevent or reduce the stress caused by abiotic and biotic factors. It also favors vegetative growth in plants.

Agrotoxics: also known as crop protection agents, pesticides, biocides, agrochemicals, biologicals or phytosanitary products, are generic ways of designating the various chemical, semi chemical, biochemical or biological products used in agriculture.

According to the World Health Organization (WHO), a pesticide is defined as any substance capable of controlling a pest that may pose a risk or perturb populations or the environment. They can also be defined as substances or blends of substances used to impede the action of, or directly kill insects (insecticides), mites (mites), mollusks (molluscicides), rodents (rodenticides), fungi (fungicides), weeds (herbicides), bacteria (antibiotics and bactericides) and other forms of animal or vegetable life harmful to public health and agriculture.

Agrotoxic of interest: defined as any industrial, commercially known agrotoxic where one would desire to further their technical effects and minimize their harmful collateral effects when applied to an agricultural crop.

Ha: hectare, an agricultural surface measure equivalent to one hundred ares or one square hectometer (10,000 m2).

Fruit/grain: for the purposes of the present application for invention, fruit or grain is considered to be the result of harvesting an agricultural crop.

The list of terms, technologies and basic concepts presented in this preliminary topic must be appreciated for the proper understanding of the present invention, conferring the necessary and sufficient descriptive elements for the body of the descriptive report. It should also be used as reference for comparative analysis studies, either as hypothetical solutions of state of the art preceding the invention and not mentioned in this patent, or for other products of the same nature and same international patent classification (IPC), disclosed and/or marketed by the owners or by third parties other than the owners of this patent.

FIELD OF APPLICATION

This patent of invention describes an inventive solution highlighting a benefit for the agricultural sector. It has a broad spectrum of application to support all types of agricultural crops of interest, such as rice, corn, sorghum, corn, wheat, barley, oats, cereal (rye), triticale, soy, beans (and their varieties such as white and azuki beans), cotton, fruits (and their varieties such as peaches, apples, pineapple), potatoes, sweet potatoes, canola, linen, peas, lentils, mustard, garbanzo beans, sunflower, alfalfa seedlings, onions, pasture (hay and alfalfa), sugarcane, beets, tomatoes, stevia, saffron, manioc and curcubits (gourds), among others.

DEMANDS OF THE INVENTION

The applicant, who has expertise in the development of agricultural technology, identified a need to enhance the harvest of certain agricultural crop from a qualitative, quantitative and time-related point of view, considering that it is inevitable that agricultural crops of interest are subject to biotic and/or abiotic factors.

The qualitative point of view can be understood as the need to obtain better quality fruit or gain, translated, for example, into the size of the fruit on the plants or the nutritional quality of the fruit or grain, resulting in a highly valuable agricultural commodity crop.

The quantitative point of view may be understood as more fruit or grain produced, for example per hectare or, in other words, better yield of the agricultural crop. As well as improved control of the organism damaging the agricultural crop of interest.

The time-related point of view means a significant reduction in time to harvest, so rows can be closed early and the crop will flower earlier, in this way moving up the time to harvest the fruit or grain at its optimum point.

The economic point of view means obtaining optimized results from the harvest of a given agricultural crop from the qualitative, quantitative and time-related points of view, and should be considered the imperative desire from minimizing the economic risk to agricultural producers.

STATE OF THE ART

Below is a brief explanation of the state of the art for agrotoxic products, with the understanding of those skilled in the art in the approach of its technical effects on agricultural crops that would benefit from its applications, and the limitations of this agricultural handling process, thus consolidating the list of needs previously explained under the demands of the invention.

Definition of agrotoxic substance: agrotoxics are products used in agriculture to control pests (such as insects, diseases or weeds) that can damage crops. Agrotoxic substances can also be called crop protection agents or agrochemicals.

Agrotoxic substances may be split into several groups, however for the purposes of this invention only the three main groups need to be mentioned:

Insecticides: used to control insects, mites, nematodes and mollusks.

Fungicides: used to control diseases caused by fungi, bacteria and viruses.

Herbicides: used to control weeds.

Examples of applying an agrotoxic of interest:

Application of the herbicide ammonium glufosinate: application using a spraying volume of 300 l/ha on corn, performed by UDI Pesquisa in Uberlândia, MG, the quantitative (productivity) outcome is described in table 1.

TABLE 1

TECHNICAL EFFECT OF AMMONIUM GLUFOSINATE HERBICIDE

| Treatment | Dose (kg-l/ha) | Weight of 1,000 grains (g) | Index | Productivity (kg/ha) | Index |
|---|---|---|---|---|---|
| ammonium glufosinate | 1.50 | 25.89 a | 100 | 7.142 b | 100 |

Application of herbicide fomesafen+fluazifop-p-butyl: using a spraying volume of 200 l/ha on beans, performed by T. Cobbucci in São João da Aliança, GO. The quantitative result compared to the witness (no application of the product) is shown in Table 2.

TABLE 2

TECHNICAL EFFECT OF THE HERBICIDE FOMESAFEN + FLUAZIFOP-ETHYL

| Treatment | Dose (kg-l/ha) | Stage | Productivity (kg/ha) | Index |
|---|---|---|---|---|
| Witness | — | V4 | 3.582 | 100 |

Application of miticide propargite: application to control mites in lab conditions, performed by Unesp in Jaboticabal, SP. Quantitative (control) results are described in table 3. Assessments were made of the plant treated with miticide propargite against the witness plant (untreated).

TABLE 3

TECHNICAL EFFECT OF APPLYING MITICIDE PROPARGITE

| Treatment | Dose (g-mL/100 L) | Mite control (%) | | | | |
|---|---|---|---|---|---|---|
| | | 1 DFA | 2 DFA | 3 DFA | 4 DFA | 7 DFA |
| 1. Witness | — | 0 | 0 | 0 | 0 | 0 |
| 2. Propargite | 30 | 59 | 63 | 70 | 77 | 98 |

Key:
DFA: Days following application

Application of miticide abamectin: application to control mites in lab conditions, performed by Unesp in Jaboticabal, SP. Quantitative (control) results are described in Chart 4. Assessments were made of the plant treated with miticide abamectin against the witness plant (untreated).

TABLE 4

TECHNICAL EFFECT OF APPLYING MITICIDE ABAMECTIN

| Treatment | Dose (g-mL/100 L) | Mite control (%) | | | | |
|---|---|---|---|---|---|---|
| | | 1 DFA | 2 DFA | 3 DFA | 4 DFA | 7 DFA |
| 1. Witness | — | 0 | 0 | 0 | 0 | 0 |
| 2. Abamectin | 30 | 20 | 20 | 20 | 45 | 62 |

Key:
DFA: Days following application

It is important to point out that the list of examples is not limited to corn, beans or laboratory crops, nor to the use of the agrotoxics of interest—ammonium glufosinate, fomesafen+fluazifop-p-ethyl, propargite and abamectin, whose results in terms of improved performance may be extensively understood for application of any type of agrotoxic of interest to the most varied agricultural crops, bearing in mind the differences in performance.

Identification of problems: although it is well known that agrotoxic substances are essential to fight diseases, pests and control weeds, the matter of toxicity in use is evident. This aspect presents a significant degree of complexity, as toxicity has a broad spectrum of action on the environment, on the animal life living within this environment, and on the very fruit of the agricultural crop.

In fact, the use of agrotoxic substances avoids the loss of 10 to 40% of all farm output in the world. While the use of agrotoxics has been proven useful, there is still over-use and improper use of these products.

Improper use of agrotoxics results in, among other side effects, specific pest resistance, and may also be harmful to animal health, be it by exposure to the contaminated environment or consumption of the agricultural product, which may have an improper concentration of the toxic constituents of the agrotoxic.

Specifically from a technical point of view, exaggerated use may lead to plant stress and/or phytotoxicity, impacting their development, flowering and ultimately the quality or the fruit or grain, reducing yield. It is not unusual that this stress cannot be observed visually, but is sufficient to cause significant damage to the plants and thus to the crop as a whole.

WHAT IS PROPOSED BY THIS INVENTION

Although the technical impact of the isolated application of the agrotoxics of interest is improved productivity of the agricultural harvest of interest, from the quantitative, qualitative and time-related points of view, optimizing these effects is a constant search on the part of the agricultural industry, favoring their acceptance in the most demanding markets and supporting the pricing of agricultural commodities.

Therefore, the search for improved agricultural yield coincides with the need to make the most of crop areas, thus avoiding planting in virgin areas that would originally not be used for agricultural use, thus fulfilling an ecologic agenda.

Following this brief introduction, the aim of the present invention is to potentialize the practical technical effect provided by agrotoxics in general.

In addition, and no less important, the aim of the present invention is to recover the practical technical effect of certain agrotoxics, whose recent application results have indicated a loss of efficacy. In other words, the final productivity obtained in agricultural harvests has been lower than that in each of the previous applications.

Distinctive feature: to enable the objectives of the invention, a synergistic blend of a Folcysteine-based biostimulant and an agrotoxic of interest was designed, potentializing the results observed in an agricultural crop of interest from a qualitative, quantitative and time-related point of view.

From a technical point of view, a blend of a folcysteine-based biostimulant and an agrotoxic of interest reduces the stress and/or phytotoxicity effects that impact the plants of an agricultural crop when subjected to the isolated application of agrotoxics of interest, thus improving the yield and quality of the fruits/grains obtained from the harvest.

Furthermore, in addition to mitigating the negative effects of toxicity associated with the use of agrotoxics, the use of the blend in this invention potentializes the qualitative effects of the agrotoxic of interest when compared to its use alone.

DETAILED DESCRIPTION OF THE INVENTION

The following detailed description shall be read and interpreted as a reference to the scope of possible blends between a folcysteine-based biostimulant and the listed array of agrotoxics of interest. However, this description is not exhaustive and is not intended to limit the scope of the invention, which is limited merely by the claims.

On the inventive blend: for the purposes of this invention, a blend of a folcysteine-based biostimulant and at least one agrotoxic of interest is defined by the following formula:

$$B=(X)+(Y)$$

where:
B=blend obtained from a folcysteine-based biostimulant and at least one agrotoxic of interest:
X=folcysteine-based biostimulant, whose concentration in the blend may be defined in the rage between 0.50 and 2,000 g ai/ha;
Y=at least one agrotoxic of interest, such as:
Herbicides: in this embodiment, a blend of a folcysteine-based biostimulant and at least one herbicide-type agrotoxic of interest (Y1), defined by the following formula:

$$B=(X)+(Y1)$$

The compositions used to reduce crop damage may comprise at least one herbicide (Y1), selected from among the group of active ingredients: (2,4-D), (2,4-D+picloram), (2,4-DB), (acetochlor), (4-indole-3-butyric acid+gibberellic acid+kinetin), (gibberellic acid), (gibberellic acid+benzyladenine), (acifluorfen sodium), (acifluorfen sodium+bentazone), (aclonifen), (alachlor), (alachlor+atrazine), alachlor+trifluralin), (alloxydim), (ametrine), (ametrine+clomazone), (ametrine+diuron), (ametrine+diuron+MCPA), (ametrine+flumioxazine), (ametrine+simazine), (ametrine+trifloxisulfuron sodium), (amicarbazone), (amicarbazone+clomazone), (amicarbazone+flazasulfuron), (amicarbazone+hexazinone+diuron), (amicarbazone+tebutiuron), (aminopyralid), (aminopyralid+2,4-D), (aminopyralid+fluroxipyr methyl), (aminosulfuron), (amitraz), (amitrole), (naphthalic anhydride), (asulam), (atrazine), (atrazine+glyphosate), (atrazine+nicosulfuron), (atrazine+S-metolachlor), (atrazine+simazine), (azafenidin), (azimsulfuron), (beflubutamid), (benefin), (bensulfuron), (bensulide), (bentazone), (bentazone+imazamox), (bentazone+paraquat), (benzamide), (pyrimidinyl benzoate), (benzofenap), (benzofuran), (bispyribac sodium), bromacil), (bromacil+diuron), (methyl bromide), (bromoxynil), (buctril), (butachlor), (butafenacil), (butylate), (butroxidim), (carbetamide), (carfentrazone-ethyl), (carfetrazone-ethyl+clomazone), (cyhalofop-butyl), (cyanazine), (cycloate), (cyclosulfamuron), (cycloxydim), (cinnmethylin), (cinosulfuron), (clethodim), (clethodim+fenoxaprop-p-ethyl), (clethodim+haloxyfop-methyl, (clethodim+quizalofop-p-ethyl), (clodinafop-propargyl), (clomazone), (clopyralid), (cloransulam-methyl), (mepiquat chloride), (chlorimuron-ethyl), (chlortoluron), (chlorsulfuron), (dazomet), (decanol), (DCPA), (desmedipham), (desmetrine), (devrinol), (dicamba), (dichlobenil), (dichlorprop), (dichlofop), (diclosulam), (difenzoquat), (diflufenican), (diflufenzopyr), (dimefuron), (dimethenamid), (dinoterb), (diquat), (dithiopyr), (diuron), (diuron+glyphosate), (diuron+hexazinone), (diuron+MSMA), (diuron+paraquat), (diuron+sulfentrazone), (diuron+thidiazuron), (diuron+tebuthiuron), (DSMA), (endotal), (EPTC), (esprocarb), ethalfluralin), (ethametsulfuron), (ethephon), (ethephon+cyclanilide), (ethephon+glufosinate ammonium salt), (ethofumesate), (ethoxysulfuron), (phenmedipham), (fenoxaprop-p-ethyl), (fentrazamid), (flazasulfuron), (floransulam), (fluazifop-p-butyl), (fluazifop-p-butyl+fomesafen), (flucarbazone sodium), (flufenacet), (flufenpyrethyl), (flumetralin), (flumetsulam), (flumiclorac-pentyl), (flumioxazin), (fluometuron), (fluoroglycofen), (flupyrsulfuron-methyl sodium), (Flurochloridone), (fluridone), (fluroxypyr-methyl), (fluroxypyr-methyl+picloram), (fluroxypyr-methyl+triclopyr-butolyl), (flutarmone), (fluthiacet-methyl), (fomesafen), (foramsulfuron), (foramsulfuron+iodosylfuron-methyl), (Fosamine), (glyphosate), (glyphosate+2,4-D), (glyphosate+carfentrazone-ethyl), (glyphosate+simazine), (glufosinate-ammonium salt), (halosulfuron-methyl), (haloxyfop-p-methyl), (hexazinone), (hexazinone+sulfometuron-methyl), (maleic hydrazine), (Imazamethabenz), (imazamox), (imazapic), (imazapic+imazapyr), (imazapix+imazethapyr), (imazapyr), (imazaquin), (imazaquin+glyphosate), (imazaquin+imazethapyr+pendimethalin), (imazetapir), (imazetapir+flumioxazine), (imazetapir+glyphosate), (indaziflam), (indaziflam+isoxaflutole), (indaziflam+metribuzim), (iodosulfuron-methyl), (isoproturon), (isoxaben), (isoxaflutole), (isoxazole), (isoxazolidinone), (lactofen), (linuron), (mecoprop), (MCPA), (MCPB), (mefenacet), (mesosulfuron), (mesotrione), (metamitron), (metazachlor), (metam), (methylcyclopropene), (methylbenzuron), (metolachlor), (metolachlor+glyphosate), (Metoxuron), (metribuzin), (metsulfuron-methyl), (molinate), (monolinuron), (MSMA), (napropamide), (naptalam), (nicosulfuron), (norflurazon), (ioxynil octanoate), (oryzalin), (orthosulfamuron), (oxadiazone), (oxadiargyl), (oxyfluorfen), (paclobutrazol), (paraquat), (pebulate), (pendimethalin), (penoxsulam), (picloram), (Picolinafen), (pyraflufen-ethyl), (Pyrazolinate), (pyrazosulfuron-ethyl), (pyrazole), (pyrazome), (pyrazoxifen), (pyribenzoxim), (pyrithiobac-sodium), (pyroxsulam), (pretilachlor), (primisulfuron), (prodiamine), (profoxydim), (prohexadione), (prometone), (promethrin), (pronamide), (propachlor), (propanyl), (propanyl+triclopyr-butotyl), (propaquizafop), (propazine), (propoxicarbazone), (propisochlor), (prosulfocarb), (prosulfuron), (pyrazon), (quinclorac), (quizalofop-p-ethyl), (quizalofop-p-tefuryl), (rimsulfuron), (s-metolachlor), (s-metolachlor+glyphosate), (saflufenacil), (sethoxydim), (siduron), (simazine), (simethrin), (sulcotrione), (sulfentrazone), (sulfentrazone+tebuthiuron), (sulfometuron-methyl), (sulfosulfuron), (terbumtan), (tebuthiuron), (tebuthiuron+flazasulfuron), (tembotrione), (tepraloxydim), (terbacil), (terbuthylazine), (tenilchlor), (thidiazuron), (thiazopyr), (thifensulfuron), (thiobencarb), (tralcoxidim), (triallate), (triasulfuron), (tribenuron), (triclopyr-butotyl), (triclopyr-butotyl+picloram), (trietazine), (trifloxysulfuron-sodium), (trifluralin), (triflusulfuron), (trinexapac-ethyl), (vernolate).

Fungicides: in this embodiment the blend of a folcysteine-based biostimulant and at least one agrotoxic of interest of the fungicide type (Y2) is defined by the following formula:

$$B=(X)+(Y2)$$

The compositions used to reduce crop damage may comprise at least one fungicide (Y2) selected from among the group of active ingredients: (2-phenylphenol), (8-hydroxyquinoline sulfate), (copper acetate), (fentin acetate), (acibenzolar-S-metjyl), (benzohydroxamic acid), (dehydroacetic acid), (allyl alcohol), (aldimorph), (ampropylphos), (anilazine), (azaconazole), (potassium azide), (sodium azide), (azithiram), (azoxystrobin), (azoxystrobin+benzovindiflupyr), (azoxystrobin+cyproconazole), (azoxystrobin+difenoconazole), (azoxystrobin+flutriafol), (azoxystrobin+mancozeb), (azoxystrobin+tebuconazole), (azoxystrobin+tetraconazole), (aureofungin), (*Bacillus pumulis*), (*Bacillus subtillis*), (benalaxyl), (benalaxyl+clorothalonil), (benalaxyl+mancozeb), (benodanil), (benomyl), (benquinox), (bentaluron), (isopropyl benthiavalicarb), (isopropyl benthiavalicarb+chlorothalonil), (isopropyl benthiavalicarb+fluazinam), (benzamacryl), (benzamorf), (benzovindiflupyr), (bethoxazin), (potassium bicarbonate), (binapacryl), (biphenyl), (bitertanol), (bithionol), (bixafen), (blasticidin-S), (boscalid), (boscalid+kresoxim-methyl), (boscalid+dimoxystrobin), (boscalid+pyraclostrobin), (methyl bromide), (bromuconazole), (bupirimate), (buthiobato), (butylamine), (carbamorf), (carpropamid), (carvone), (captan), (carbendazim), (carbendazim+kresoxim methyl+tebuconazole), (carbendazim+tebuconazole), (carbendazim+thiram), (copper carbonate), (carboxin), (carboxin+thiram), (kasugamcin), (kasugamcin+copper oxychloride), (cyazofamid), (cyclafuramid), (cyclohexamide), (cyflufenamid), (cymoxanil), (cymoxanil+chlorothalonil), (cymoxanil+famoxadone), (cymoxanil+mancozeb), (cypendazole), (cyproconazole), (cyproconazole+difenoconazole), (cyproconazole+propiconazole), (cyprofuram), (cyprodinil), (climbazole), (chlobenthiazone), (chlobenthiazone chloride), (propamocarb hydrochloride), (propamocarb hydrochloride+chlorothalonil), (propamocarb hydrochloride+fenamidone), (propamocarb hydrochloride+fluopicolide), (chlorofenazole), (chloroniformethan), (cloroneb), (chloronil), (chloropicrin), (chlorothalonil), (chloroquinoxy), (chlorothalonil+dimethomorf), (chlorothalonil+metalaxyl-M), (chlorothalonil+copper oxychloride), (chlorothalonil+tebuconazole), (chlorothalonil+thiophanate methyl), (clotrimazole), (clozolinate), (cresol), (kresoxim-methyl), (kresoxim methyl+epoxiconazole), (kresoxim methyl+tebuconazole), (copper and zinc chromate), (cufraneb), (cuprobam), (dazomet), (DBCP), (debacarb), (decafentin), (diclocimet), (dichlofluanid), (dichlomezin), (dichlon), (dichloran), (dichlorophen), (diclozolin), (dichlobutrazole), (diethofencarb), (diphenylamine), (difenoconazole), (difenoconazole+fludioxonil), (diflumetorim), (dimethirimol), (dimethomorph), (dimoxystrobin), (dinobuton), (diniconazole), (dinocap), (dinocotom), (dinopentom), (dinosulfon), (dinoterb), (dipyrithionedisu), (disulfiram), (ditalimfos), (dithianone), (edifenphfos), (sulfur), (epoxiconazole), (epoxiconazole+kresoxim methyl), (epoxiconazole+pyraclostrobin), (epoxiconazole+fluxapyroxad+pyraclostrobin), (epoxiconazole+thiophanate methyl), (spiroxamine), (streptomycin), (etaconazole), (ethaboxam), (etem), (etridiazole), (ethirimol), (ethoxyquin), (Melaleuca altemifolia extract), (Reynoutria sachalinensis extract), (famoxadone), (famoxadone+mancozeb), (fenamidone), (fenaminosulfa), (fenapanyl), (fenarimol), (fenbuconazole), (fenfuram), (fenhexamid), (fenitopram), (fenoxanila), (fenpicronila), (fenpropidim), (fenpropimorfe), (femtim), (ferbam), (ferimzona), (fluazinam), (fluazinam+thiophanate-methyl), (fludioxonil), (fludioxonil+metalaxyl-M), (fludioxonil+metalaxyl-M+azoxystrobin), (fluindapyr), (flumetover), (flumorf), (fluopicolide), (fluorimid), (fluotrimazole), (fluoxastrobin), (fluoxastrobin+chlorothalonil), (fluoxastrobin+tebuconazole), (fluquinconazole), (flusilazole), (flusulfamide), (flutolanil), (flutriafol), (flutriafol+carbendazim), (flutriafol+thiophanate-methyl), (fluxapyroxad), (fluxapyroxad+pyraclostrobin), (folpet), (fosdiphen), (fosetyl), (ferric phosphate), (formaldehyde), (phthalide), (fuberidazole), (furalaxyl), (furametpyr), (furcarbanyl), (furconazole), (furconazole-cis), (furmecycloxy), (furofanate), (glyodin), (griseofulvin), (guazatine), (halacrinate), (hexylthiofos), (copper hydroxide), (himexazol), (iminoquitadin), (iprobenfos), (iprovalicarb), (isopirazam), (isoprothiolano), (isovaledione), (hexaconazole), (imazalil), (imibenconazole), (inpyrfluxam), (ipconazole), (ipconazole+thiram), (iprodione), (iprovalicarb+propineb), (methyl isothiocyanate), (mancozeb), (mancozeb+dimethomorph), (mancozeb+metalaxyl-M), (mancozeb+copper oxychloride), (mancozeb+thiophanate-methyl), mancozeb+zoxamide), (mandipropamide), (mandipropamide+chlorothalonil), (maneb), (mebenyl), (mecarbinzid), (mepanipirim), (metalaxyl), (metalaxyl-M), (metalaxyl-M+thiabendazole+fludioxonil), (metalaxyl-M+tihabendazole+fludioxonil+thiamethoxam), (metam sodium), (metconazole), (metiram), (metiram+piraclostrobina), Metominostrobina, (metominostrobina+tebuconazol), (metisulfovaxi), (mepronila), (metam), (metazoxolon), (metasulfocarb), (methfuroxam), (metraphenone), (myclobutanil), (milbemectin), (milneb), (miclozolin), (nabam), (copper naphthenate), (zinc naphthenate), (natamycin), (nicobifem), (nitrostyrene), (nitrothal isopropyl), (nuarimol), (octhilinone), (ofuraci), (orysastrobin), (sodium orthophenyl phenoxy), (oxadixyl), (oxycarboxin), (copper oxychloride), (cuprous oxide), (tributyl tin oxide), (oxypoconazole), (pefurazoate), (pencycuron), (penconazole), (penflufeb), (pentachlorophenol), (sodium pentachlorophenol), (penthiopyrad), (picoxystrobin), (picoxystrobin+benzov, indiflupir), (picoxystrobin+cyproconazole), (picoxystrobin+tebuconazoel), (picoxystrobin+tebuconazole+mancozeb), (piracarbolida), (piraclostrobina), (piraclostrobina+tiofanatomethyl), (piraclostrobina+tiofanato methyl+fipronil), (pyrazophos), (pyridinitrile), (pyriphenox), (pyrimethanil), (pyrimethanil+iprodione), (pirocarbonato di-etilico), (pyroquilon), (pyroxychlor), (piroxyfur), (polycarbamate), (polyoxin), (polyoxorim), (barium polysulfate), (potassium polysulfite), sodium polysulfite, (probenazole), (procymidone), (prochloraz), (propineb), (propiconazole), (propiconazole+difenoconazole), (propiconazole+tebuconazole), (prothiocarb), (prothioconazole), (proquinazid), (quinacetole), (quinazamid), (quinconazole), (quinomethionate), (quinoxyfen), (quintozene), (rabenzazole), (salicylanilide), (sedaxane), (silthiofam), (simeconazole), (copper sulfate), (sultropen), (tebuconazole), (tecloftalam), (tecoram), (tequinazen), (tetraconazole), (thiabendazole), (thiadifluor), (thiadinyl), (tifluzamide), (ticiofen), (potassium thiocyanate), (thiochlorophenfin), (thiofanatr-methyl), (thioquinoxy), (thioximid), (thiram), (tolclofos methyl), (tolyfluanid), (triadimefon), (triadimenol), (triadimenol+disulfoton), triadimenol+tebuconazole), (triamifos), (triarimol), (triazibutylic), (triazoxide), (tricyclazole), (Trichoderma asperellum), (Trichoderma harzianum), (trichlamide), (tridemorph), (triforine), (trifloxystrobin), (trifloxystrobin+ciproconazole), (trifloxystrobin+propiconazole), (trifloxystrobin+prothioconazole), (trifloxystrobin+tebuconazole), (triflumizole), (triticonazole), (uniconazole), (uniconazole-P), (validamycin), (vinclozolin), (zarilamid), (zineb), (ziram), (zoxamid), (zoxamid+cymoxanil).

Insecticides: in this embodiment the blend of a folcysteine-based biostimulant and at least one agrotoxic of interest of the insecticide type (Y3) is defined by the following formula:

$B=(X)+(Y3)$

The compositions used to reduce crop damage may comprise at least one insecticide (Y3), selected from among the group of active ingredients: (1,4 dimethoxybenzene), (4,8-dimethyldecanal), (5,9-dimethylpentadecane), (abamectin), (Neoseiulus californicus mite), (acephate), (Acequinocyl), (acetamiprid), (acetamiprid+alpha-cypermethrin), (acetamiprid+bifenthrin), (acetamiprid+etofenprox), (acetamiprid+fenpropathrin), (acetamiprid+pyriproxyfen), \[(E,Z,Z)-3,8,11-tetradecatrienyl acetate], (Z-7 dodecenyl acetate), (E,Z-4,7-tridecadienyl acetate), ((Z,E)-9,12-tetradecadienyl acetate), ((Z)-9-tetradecenyl acetate+(Z)-9-dodecenyl acetate), ((Z)-8-dodecenyl acetate+(E)-8-dodecenyl acetate), ((EZ)-3,5-dodecadienyl acetate+(Z)-9 hexadecenyl acetate), ((E,Z)-7,9-dodecadienyl acetate), ((E,Z)-3,8-tetradecadienyl acetate+(E,Z,Z) 3,8,11-tetradecatrienyl acetate), ((E)-8-dodecenyl acetate+(Z)-8-dodecenyl acetate), ((E)-8-dodecenyl acetate+(Z)-8-dodecenyl acetate+Z-8-dodecenol+(E,Z)-5 dodecadienyl acetate), (acrinathrin), (alanycarb), (lauryl alcohol), (aldicarb), (alpha-cypermethrin), (alpha-cypermethrin+teflubenzuron), (alethrin), (amitraz), (azadiracthtin, (azamethiphos), (azinfos-ethyl), (azinphos-methyl), (azocyclotin), (Bacillus sphaericus), (Bacillus thuringiensis), (Baculovirus anticarsia), (Beauveria bassiana), (bendiocarb), (benfuracarb), (bensultape, (emamectin benzoate), (benzoximate), (beta-cyfluthrin), (beta-cyfluthrin+imidacloprid), (beta-cyfluthrin+triflumuron), (beta-cypermethrin), (bifenazate), (bifenthrin), (bifenthrin+carbosulfane), (bifenthrin+imidaclopride), (bioallethrin), (bistriflurone), (boraxi), (bioresmethrin), (methyl bromide), (buprofezin), (butocarboxime), (butoxicarboxime), (cadethrin), (cadusafos), (carbaryl), (carbofuran), (carbosulfane), (cyalothrin), (cyanide), (cyanophos), (cyantraniliprole), (cyenopyrafen), (cyphenothrin), (cyflumetofem), (cyfluthrin), (cyhexatin), (cycloprothrin), (cyanomethionate), (cypermethrin), (cypermethrin+profenofos), (cypermethrin+thiamethoxam), (cyromazine), (clofentezine), (chlordane), (chlorantraniliprole), (chlorantraniliprole+abamectin), (chlrfenapyr), (chlorfluazuron), (aviglycine hydrochloride), (cartap hydrochloride), (formentanate hydrochloride), (chlorthal-dimethyl), (chlorethoxyfos), (chlorfenvinphos), (chlormephos), (chloropicrin), (chlorpiyrifos), (chlorpiyrifos memthyl), (chlothianidin), (codlelure), (Cotesia flavipes), (coumaphos), (criolite), (chromafenozide), (BT GMO—Cry1Ab, Cry1Ac, Cry1Fa, Cry2Ab, mCry3A, Cry3Ab, Cry3Bb e Cry34/35Ab1 cultivars), (deltamethrin), (demoton-S-methyl), (dinotefuran), (diafenthiuron), (diazinone), (dicofol), (dicofol+tetradifon), (dichlorvos/DDVP), (dicrotophos), (dietholate), (diflubenzuron), (dimethylvinphos), (dimethoate), (disulfoton), (dithianone), (DNOC), (Ecklonia maxima), (empenthrin), (endosulfan), (esfenvalerate), (esfenvalerate+fenitrothion), (spinetoram), (spinosad), (spirodiclofen), (spiromesifen), (spirotetramate), (ethiofencarb), (ethion), (ethiprole), (etofenprox), (ethoprophos), (etoxazole), (etridiazole), (eugenol-methyl), (eugenol-methyl+spinosad), (Sophora flavencens extract), (famphur), (fenamiphos), (fenazaquin), (fenitrothion), (fenobucarb), (fenothrin), (fenoxycarb), (fenpyroximate), (fenpropathrin), (phentoate), (fenthion), (fenvalerate), (fipronil), (fipronil+alphacypermethrin), (flonicamid), (fluacrypyrim), (flubendiamide), (flucycloxuron), (flucythrinate), (flufenoxuron), (flumethrin), (fluvalinate), (phorate), (formetanate), (phosalone), (phosphamidon), (aluminum phospite), (calcium phospite), (magnesium phospite), (zinc phospite), (phosphine), (phosmet), (fosthiazate), (phoxim), (furathiocarb), (yh-cyhalothrin), (gamma-cialothrin+malathion), (grandlure), (glandlure+malathion), (gossyplure), (halfenprox), (halofenozide), (heptenophos), (hexaflumuron), (fentin hydroxide), (hexythiazox), (hydramethylnon), (hydrophen), (imicyafos), (imidacloprid), (imidacloprid+flutriafol), (imidacloprid+thiodicarb), (imidacloprid+triadime), (imiprothrin), (indoxacarb), (isofenphos), (isoprocarb), (isopropyl salicylate), (isoxathion), (lambda-cyalothrin), (lambda-cyalothrin+chlorantraniliprole), (lambda-cyalothrin+thiamethoxam), (lufenuronprofen), (lufenuron+profenophos), (malathion), (mercarbam), (metaflumizone), (methamidophos), (Metarhizium anisopliae), (metihdathion), (methiocarb), (methomyl), (methomyl+methanol), (methomyl+novaluron), (methoprene), (methoxyfenozide), (metolcarb), (methoxychlor), (mevinphos), (mibemectin), (monocrotophos), (nalede), (nicotine), (nitenpyram), (novaluron), (noviflumuron), (ometoate), (oxamyl), (oxydemeton-methyl), (fenbutatin oxide), (Paecilomyces lilacinus), (parathion), (parathion-methyl), (permethrin), (pymetrozine), (pyraclophos), (pirethrins), (pyridaben), (pyridalyl), (pyridafenthion), (pirimicarb), (pyrimidifen), (pirimiphos-methyl), (pyriproxyfen), (pralethrin), (profenophos), (propargite), (propetamphos), (propoxur), (prothiofos), (quinalphos), (quinopren), (resmethrin), (rincofol), (rotenone), (s-cyclopentenyl), (serricornin), (silafluofen), (sordidim), (Steinernema puertoricense), (sulfluramid), (sulfuryl fluoride), (sulfotep), (tartar emetic), (tebufenozide), (tefubenpyrad), (tebupyrinphos), (teflubenzuron), (tefluthrin), (Tefosi a candida), (temephos), (terbuphos), (diatomaceous earth), (theta-cypermethrin), (tetraclorvinphos), (tetradifon), (tetramethrin), (thiabendazole) (thiachoprid), (thiamethoxam), (thiamethoxam+cypermethrin), (thiamethoxam+cyproconazole), (thiamethoxam+ chlorantraniliprole), (thiamethoxam+difenoconazole+ metalaxyl-M), (thiocyclam), (thiodicarb), (thiofanox), (tihometon), (thiosultap sodium), (tolfenpyrad), (tralomethrin), (triazamate), (triazophos), (trimedlure), (transfluthrin), (Trichogramma galloi), (trichlorfon), (triflumuron), (trimethacarb), (vamidothion), (VPN-HzSNPV virus), (xylilcarb), ((Z,Z,Z)-3,6,9-tricosatriene), ((Z)-11-hexadecenal+ (Z)-9-hexadecenal), (Z 11-hexadecenale Z 13-octadecene), (zeta-cypermethrin), (zeta-cypermethrin+bifenthrin).

Forms of presentation: the blend (B) of folcysteine-based biostimulant (X) and at least one agrotoxic of interest (Y) defined by the formula B=(X)+(Y), may be presented as a solid or liquid, with concentrations of each component X and Y varying between 0.1% and 99%.

Solid blend: in the form of soluble powders, granules, pellets, emulsionable concentrate, impregnated with the active ingredients.

This form of presentation includes the possible use of dyes (Z1) or added adherent coatings (Z2), which help the active ingredients (X) and (Y) adhere to the plant. The solid blend may be represented by the formula:

$$Bs=((X+Y+Z1+Z2)+Z3)$$

where:
Bs=blend obtained from a folcysteine-based biostimulant and at least one agrotoxic of interest;
X=folcysteine-based biostimulant, whose concentration in the blend may be defined in the rage between 0.50 and 2,000 g ai/ha;
Y=Agrotoxic of interest;
Z1=dyes such as, but not limited to iron oxide, titanium oxide and Prussia blue, and organic dyes such as alizarin dyes, azo dyes and metal phthalocyanine dyes;
Z2=screening nutrients such as iron, manganese, boron, copper, cobalt, molybdenum and zinc salts;
Z3=adherent coatings such as, but not limited to carboxymethylcellulose, natural and synthetic polymers in different forms such as powders or granules, latex, gum Arabic, polyvinyl alcohol, polyvinyl acetate, phospholipids such as cephalins and lecithins, and synthetic phospholipids.

The solid blend (Bs) shall preferably be applied using spraying or spreading techniques.

Liquid blend: in the form of liquid ingredients, solutions, suspensions and/or emulsions, may be prepared from the active ingredients (X) and (Y) alone an then blended in the tank and diluted for use, thus obtaining a liquid solution or emulsion. Alternatively, components (X) and (Y) may be pre-blended, needing only to be diluted in the tank to obtain the blend. In both situations the blend shall preferably be applied using spraying and/or atomization techniques.

In general, when preparing the liquid blend, a preliminary blend or suspension is prepared with at least one stabilizing agent (W1) and a solvent or diluent (W2). After this preliminary blend or suspension is prepared, the appropriate amount of adjuvant agents (W3) is added. A pigment or dye (W4) and screening nutrients (W5) may also be added to this preliminary blend. Finally, Folcysteine (X) and the agrotoxic of interest (Y) are added to prepare the final blend until a state of diluted and homogeneous blend is achieved, ready to be applied to an agricultural crop by, for example, spraying.

Thus, a liquid blend presentation may be represented by the following formula:

$$Bl=(((W1)+(W2)+(W3)+(W4)+(W5)+((X)+(Y)))$$

where:
Bl=blend obtained from a folcysteine-based biostimulant and at least one agrotoxic of interest:
X=Folcysteine in a concentration ranging from 0.50 to 2,000 g ai/ha;
Y=Agrotoxic of interest;
W1=stabilizing agent;
W2=Diluents such as a water-immiscible non-polar solvent (W21), an aprotic solvent
(W22), a polar organic solvent blended with aprotic water;
W21=non-polar solvents include, for example, substituted or unsubstituted aliphatic or aromatic hydrocarbons and alkyl esters, including but not limited to canola (*B. napus*), linseed, saffron (*Carthamus tinctorius* L.), soy and sunflower oil methyl, ethyl and butyl esters. A non-limiting example of methyl ester is Agent 2416-21 manufactured by Stepan Company (22 W. Frontage Road, Northfield, Illinois).
W21=polar, aprotic water-miscible solvents include, for example, alkyl lactates, isopropyl lactate, alkyl carbonates, polyethylene glycols, poliethylene glycol alkyl esters, polypropylene glycols and polypropylene alkyl esters or mixtures thereof.
W3=adjuvants include, for example, surfactants (emulsifiers), crop oils, fertilizers, dispersants, compatibility agents, foaming agents, anti-foams, correctives and spraying dyes (dyes); Adjuvants may be present in any desired amount.For example, a formulation may contain from 1% to 3% of adjuvant, 3% to 8% adjuvant, 8% to 16% adjuvant, 17% to 30% adjuvant or 30% (e.g. 40% or more) or more adjuvant;
W4=dyes such as, but not limited to iron oxide, titanium oxide and Prussia blue, and organic dyes such as alizarin dyes, azo dyes and metal phthalocyanine dyes;
W5=screening nutrients such as iron, manganese, boron, copper, cobalt, molybdenum and zinc salts.

EXAMPLES

Technical effect obtained: the following detailed description shows some of the forms to apply a "blend of a folcysteine-based biostimulant and an agrotoxic of interest". Such examples are intended to limit the scope of the invention, which is limited by its claims.

Example 1: Test Performed by Udi Pesquisa in Uberlândia, MG with 4 Repetitions and 4 Treatments In the first (treatment 1), the plant was treated only with Herbicide AI1 as a comparison reference. The other treatments (2, 3 and 4) used a blend of a folcysteine-based biostimulant and AI1, an agrotoxic of interest (ammonium glufosinate-based), a volume of 300/ha was prayed on stage V4 corn plants. See the results in the following table:

TABLE 5

FOLCYSTEINE-BASED BIOSTIMULANT + HERBICIDE (AI1)

| Treatments | Dose (kg-l/ha) | Weight of 1,000 grains (g) | Index | Productivity (kg/ha) | Index |
|---|---|---|---|---|---|
| 1. Y | 1.50 | 25.89 a | 100 | 7.142 b | 100 |
| 2. B1 | 0.50 | 27.95 a | 108 | 8.358 a | 117 |
| 3. B1 | 1.00 | 27.75 a | 107 | 8.375 a | 117 |
| 4. B1 | 2.00 | 30.26 a | 117 | 8.498 a | 119 |

Key:
Y = ammonium glufosinate herbicide
B1 = blend of a folcysteine-based biostimulant and an agrotoxic of interest - an ammonium glufosinate-based herbicide.

The results of the application of the blend of the folcysteine-based biostimulant and the herbicide (ammonium glufosinate) showed that the blend of a folcysteine-based biostimulant and a herbicide agrotoxic of interest (ammonium glufosinate) consistently increased the weight of harvested corn grains and the yield measured in volume of grain per hectare (treatment 2). This performance was repeated in subsequent treatments (see treatments 3 and 4).

Example 2: Test Performed by T. Cobbucci in São João Da Aliança, GO, with 4 Repetitions and 4 Treatments Treatment 1 is a sample of the plant with no treatment at all (Witness), and the other treatments (2, 3 and 4) used a blend of a folcysteine-based biostimulant and a herbicide AI2 agrotoxic of interest (fomesafen+fluazifop-p-ethyl), sprayed in a volume of 200 l/ha of the blend applied to stage V2 bean plants. The results can be seen in the following table:

TABLE 6

FOLCYSTEINE-BASED BIOSTIMULANT + HERBICIDE (AI2)

| Treatment | Stage | Dose (kg-l/ha) | Productivity (kg/ha) | Index |
|---|---|---|---|---|
| 1. Witness | — | — | 3.582 | 100 |
| 2. B2 | V4 | 0.50 | 3.804 | 106 |
| 3. B2 | V4 | 1.00 | 4.206 | 117 |
| 4. B2 | V4 | 2.00 | 4.326 | 121 |

Key:
Witness = plant with no treatment.
B2 = Blend of a folcysteine-based biostimulant and an agrotoxic of interest, a fomesafen + fluazifop-p-ethyl based herbicide.

The results showed that the blend of a folcysteine-based biostimulant and a herbicide agrotoxic of interest AI2 (fomesafen+fluazifop-p-ethyl) in stage V4 contributed to progressive increases in yield of 6%, 17% and 21% compared to the untreated (witness) plant.

Example 3: Complement to the Test Performed by T. Cobbucci in São João Da Aliança, GO, the Results of which are Submitted in Example 2, where 4 Repetitions and 7 Treatments were Performed The first one (treatment 1) is a plant with no treatment at all (Witness). The three subsequent treatments (2, 3 and 4) used a blend of a folcysteine-based biostimulant and an agrotoxic of interest, herbicide AI2 (fomesafen+fluazifop-p-ethyl based), sprayed in a volume of 200 l/ha of the blend on stage V4 corn plants.

Lastly, the final treatments (5, 6 and 7) used a blend of a folcysteine-based biostimulant and an agrotoxic of interest, fungicide AI3 (based on pyraclostrobin) sprayed in a volume of 200l/ha on stage R5 bean plants. The results are available in the following table:

TABLE 7

FOLCYSTEINE-BASED BIOSTIMULANT + HERBICIDE (AI2) + FUNGICIDE (AI3)

| Treatment | Stage | Dose (kg-l/ha) | Productivity (kg/ha) | Index |
|---|---|---|---|---|
| 1. Witness | — | — | 3.582 | 100 |
| 2. B2 | V4 | 0.5 | 3.804 | 106 |
| 3. B2 | V4 | 1.0 | 4.206 | 117 |
| 4. B2 | V4 | 2.0 | 4.326 | 121 |
| 5. B3 | R5 | 0.5 | 4.308 | 120 |
| 6. B3 | R5 | 1.0 | 4.242 | 118 |
| 7. B3 | R5 | 2.0 | 4.440 | 124 |

Key:
Witness = plant with no treatment.
B2 = Blend of a folcysteine-based biostimulant and an agrotoxic of interest, a fomesafen + fluazifop-p-ethyl based herbicide.
B3 = blend of a folcysteine-based biostimulant and an agrotoxic of interest, pyraclostrobin.

The results showed that, in stage R5, already taking into consideration the improved performance from applying herbicide (AI2), it was found that applying a folcysteine-based biostimulant and an agrotoxic of interest (AI3), a pyraclostrobin-based fungicide, contributed to a significant 20% to 24% increase in yield compared to the yield of the untreated (Witness) plant.

Example 4: Complementing the Test Performed by T. Cobbucci In São João Da Aliança, GO in Example 3, 4 Repetitions of 10 Treatments Were Performed The first one (treatment 1) was no treatment at all (Witness), and the three following treatments (treatments 2, 3 and 4) used a blend of a folcysteine-based biostimulant and an agrotoxic of interest, herbicide AI2 (based on fomesafen+fluazifop-p-ethyl), sprayed in a volume of 200 l/ha to stage V4 bean plants. The three subsequent treatments (5, 6 and 7) used agrotoxic of interest herbicide AI3 (based on pyraclostrobin) sprayed in a volume of 200 l/ha to stage R5 bean plants. The three final treatments (8, 9 and 10) used a folcysteine-based biostimulant and an agrotoxic of interest, herbicide AI2 (based on fomesafen+fluazifop-p-ethyl) to stage V4 plants, followed by a second application of a folcysteine-based biostimulant and an agrotoxic of interest, herbicide AI3 (pyraclostrobin based). See the results in the following table:

TABLE 8

FOLCYSTEINE-BASED BIOSTIMULANT + HERBICIDE (AI2) + FUNGICIDE (AI3)

| Treatment | Stage | Dose (kg-l/ha) | Productivity (kg/ha) | Index |
|---|---|---|---|---|
| 1. Witness | — | — | 3.582 | 100 |
| 2. B2 | V4 | 0.5 | 3.804 | 106 |
| 3. B2 | V4 | 1.0 | 4.206 | 117 |
| 4. B2 | V4 | 2.0 | 4.326 | 121 |
| 5. B3 | R5 | 0.5 | 4.308 | 120 |
| 6. B3 | R5 | 1.0 | 4.242 | 118 |

TABLE 8-continued

FOLCYSTEINE-BASED BIOSTIMULANT + HERBICIDE
(AI2) + FUNGICIDE (AI3)

| Treatment | Stage | Dose (kg-l/ha) | Productivity (kg/ha) | Index |
|---|---|---|---|---|
| 7. B3 | R5 | 2.0 | 4.440 | 124 |
| 8. B2/B3 | V4/R5 | 0.5/0.5 | 4.290 | 120 |
| 9. B2/B3 | V4/R5 | 1.0/1.0 | 5.280 | 147 |
| 10. B2/B3 | V4/R5 | 2.0/2.0 | 5.370 | 150 |

Key:
Witness = plant with no treatment.
B2 = Blend of a folcysteine-based biostimulant and an agrotoxic of interest, a fomesafen + fluazifop-p-ethyl based herbicide.
B3 = blend of a folcysteine-based biostimulant and an agrotoxic of interest, a pyraclostrobin based fungicide Results showed that, when a folcysteine-based biostimulant is applied with a fomesafen+fluazifop-p-ethyl based herbicide (Herbicide AI2), specifically in stage V4, followed by a second application of the blend, this time together with a pyraclostrobin-based fungicide (Fungicide AI3), this three-application treatment increased yields by 20% to 50%.

Example 5: Laboratory Test Performed by Unesp in Jaboticabal, SP to Measure Mite Control, Specifically Control of *Tetranychus Urticae* with 4 Repetitions and 4 Treatments The first (treatment 1) is a sample of the plant with no treatment (Witness). The second treatment is a sample treated with Folcysteine alone (treatment 2). The third treatment is a plant sample treated only with the agrotoxic of interest, miticide AI4 (based on propargite), identified as treatment 3, and the fourth treatment used a folcysteine-based biostimulant and an agrotoxic of interest, miticide AI4 (propargite-based), identified as treatment 4, applied under laboratory conditions. See the results in the following table:

TABLE 9

FOLCYSTEINE-BASED BIOSTIMULANT + MITICIDE (AI4)

| Treatment | Dose (g-mL/100 L) | Mite control (%) | | | | |
|---|---|---|---|---|---|---|
| | | 1 DFA | 2 DFA | 3 DFA | 4 DFA | 7 DFA |
| 1. Witness | — | 0 | 0 | 0 | 0 | 0 |
| 2. X | 200 | 0 | 0 | 0 | 3 | 11 |
| 3. Y | 30 | 59 | 63 | 70 | 77 | 98 |
| 4. B4 = X + Y | 200 + 30 | 74 | 74 | 87 | 87 | 100 |

Key:
DFA = Days following application
Witness = plant with no treatment.
X = folcysteine-based biostimulant
Y = agrotoxic of interest, propargite-based miticide.

Results showed that the joint application of a folcysteine-based biostimulant and an agrotoxic of interest, in this case a propargite-based miticide, resulted in a significant increase in effectiveness in eliminating *Tetranychus urticae* mites, especially in the first and second day following application (DFA), following after the third, fourth and seventh days.

Example 6: Laboratory Test Performed by Unesp in Jaboticabal, SP to Measure Mite Control, Specifically Control of *Tetranychus Urticae* with 4 Repetitions and 4 Treatments The first (treatment 1) is a sample of the plant with no treatment (Witness). The second is a sample treated with Folcysteine alone (treatment 2). The third treatment is a plant sample treated only with the agrotoxic of interest, miticide AI5, and the fourth treatment uses a blend of folcysteine-based biostimulant and an agrotoxic of interest, miticide AI5 (abamectin-based), identified as treatment 4, applied under laboratory conditions. The results are available in the following table:

TABLE 10

FOLCYSTEINE-BASED BIOSTIMULANT + MITICIDE (AI5)

| Treatment | Dose (g-mL/100 L) | Mite control (%) | | | | |
|---|---|---|---|---|---|---|
| | | 1 DFA | 2 DFA | 3 DFA | 4 DFA | 7 DFA |
| 1. Witness | — | 0 | 0 | 0 | 0 | 0 |
| 2. X | 200 | 0 | 0 | 0 | 3 | 11 |
| 3. Y | 30 | 20 | 20 | 20 | 45 | 62 |
| 4. B5 = X + Y | 200 + 30 | 63 | 69 | 90 | 95 | 100 |

Key:
DFA = Days following application
Witness = plant with no treatment.
X = folcysteine-based biostimulant
Y = agrotoxic of interest, abamectin-based miticide.

Results showed that the joint application of a folcysteine-based biostimulant and an agrotoxic of interest, in this case an abamectin-based miticide, resulted in a significant increased in effectiveness in eliminating *Tetranychus urticae* mites, especially in the first and second day following application (DFA), following after the third, fourth and seventh days.

The choice between the forms to realize the present invention, described in this detailed description, such as a solid blend (Bs) or liquid blend (Bl), are provided merely as examples. Changes, modifications and variations may be performed by those skilled in the art to any other forms of achieving the blend of a folcysteine-based biostimulant and an agrotoxic of interest without diverging from the objective revealed in the claims of this patent, which are exclusively defined by the attached claims.

Complementing, all numerical values or intervals include whole numbers, and within these ranges and fractions of values or whole numbers within the range, unless the context clearly indicates otherwise. Thus, for example, a reference to a range of 90-100% includes 91%, 92%, 93%, 94%, 95%, 95%, 97%, etc., as well as 91.1%, 91.2%, 91.3%, 91.4%, 91.5%, etc., 92.1%, 92.2%, 92.3%, 92.4%, 92.5%, and so on. A reference to a range of 90-100% includes 92.2% to 97.5%, 91.5 to 94.5, etc. A reference to a series of ranges, such as overlapping ranges between 0.1% and 15% and between 1% and 10%, varies between 0.1% and 1%, 0.1% and 10%, 1% and 15%, and 10% and 15%.

According to the description and illustrated, a "BLEND OF A FOLCYSTEINE-BASED BIOSTIMULANT AND AN AGROTOXIC OF INTEREST RESULTING IN A QUANTITATIVELY, QUALITATIVELY AND TIME-RELATED RESULT-POTENTIATING ACTION AS OBSERVED IN AN AGRICULTURAL CROP OF A PLANT OF INTEREST" now claimed fits the standards governing a patent of invention according to the Industrial Property Law. Thus, and based on the above, it deserves granting.

The invention claimed is:
1. A blend comprising folcysteine and a fungicide, the blend characterized by the formula B=(X)+ (Y2), wherein:
   B represents the blend;

X represents the folcysteine in a concentration ranging from 0.50 to 2,000 g ai/ha, and Y2 represents the fungicide, which is boscalid, pyraclostrobin, or a combination thereof.

2. The blend of claim 1, wherein the fungicide (Y2) is (boscalid), (boscalid+kresoxim-methyl), (boscalid+dimoxystrobin), (boscalid+pyraclostrobin), (epoxiconazole+pyraclostrobin), (epoxiconazole+fluxapyroxad+pyraclostrobin), (fluxapyroxad+pyraclostobin).

3. The blend of claim 1, wherein the blend is a solid blend 1, characterized by the formula Bs=((X+Y2+Z1+Z2)+Z3), wherein:

Bs represents the solid blend;

Z1 represents an inorganic pigment or dye, selected from iron oxide, titanium oxide and Prussian blue, or an organic dye selected from alizarin dyes, azo dyes and metal phthalocyanine dyes;

Z2 represents a screening nutrient selected from iron, manganese, boron, copper, cobalt, molybdenum, and zinc salts; and Z3 represents an adherent coating selected from carboxymethylcellulose, a natural polymer, a synthetic polymer, latex, gum arabic, polyvinyl alcohol, polyvinyl acetate, or a phospholipid.

4. A blend comprising folcysteine and a fungicide and an herbicide, the blend characterized by the formula B=(X)+(Y1+Y2), wherein:

B represents the blend;

X represents the folcysteine in a concentration ranging from 0.50 to 2,000 g ai/ha, Y1 represents the herbicide; and Y2 represents the fungicide, which is boscalid, pyraclostrobin, or a combination thereof.

5. The blend of claim 4, wherein the fungicide (Y2) is (boscalid), (boscalid+kresoxim-methyl), (boscalid+dimoxystrobin), (boscalid+pyraclostrobin), (epoxiconazole+pyraclostrobin), (epoxiconazole+fluxapyroxad+pyraclostrobin), or (fluxapyroxad+pyraclostrobin).

6. The blend of claim 4, wherein the herbicide (Y1) is selected from (2,4-D), (2,4-D+picloram), (2,4-DB), (acetochlor), (4-indole-3-butyric acid+giberellic acid+kinetin), (giberellic acid), (giberellic acid+benzyladenine), (acifluorfen sodium), (acifluorfen sodium+bentazone), (aclonifen), (alachlor), (alachlor+atrazine), alachlor+trifluralin), (alloxydim), (ametrine), (ametrine+clomazone), (ametrine+diuron), (ametrine+diuron+MCPA), (ametrine+flumioxazine), (ametrine+simazine), (ametrine+trifloxissulfuron sodium), (amicarbazone), (amicarbazone+clomazone), (amicarbazone+flazasulfuron), (amicarbazone+hexazinone+diuron), (amicarbazone+tebutiuron), (aminopyralid), (aminopyralid+2,4-D), (aminopyralid+fluroxipyr methyl), (aminosulfuron), (amitraz), (amitrole), (naphthalic anhydride), (asulam), (atrazine), (atrazine+glyphosate), (atrazine+nicosulfuron), (atrazine+S-metolachlor), (atrazine+simazine), (azafenidin), (azimsulfuron), (beflubutamid), (benefin), (bensulfuron), (bensulide), (bentazone), (bentazone+imazamox), (bentazone+paraquat), (benzamide), (pyrimidinyl benzoate), (benzofenap), (benzofuran), (bispyribac sodium), bromacil), (bromacil+diuron), (methyl bromide), (bromoxynil), (buctril), (butachlor), (butafenacil), (butylate), (butroxidim), (carbetamide), (carfentrazone-ethyl), (carfetrazone-ethyl+clomazone), (cyhalofop-butyl), (cyanazine), (cycloate), (cyclosulfamuron), (cycloxydim), (cinnmethylin), (cinosulfuron), (clethodim), (clethodim+fenoxaprop-p-ethyl), (clethodim+haloxyfop-methyl), (clethodim+quizalofop-p-ethyl), (clodinafop-propargyl), (clomazone), (clopyralid), (cloransulam-methyl), (mepiquat chloride), (chlorimuron-ethyl), (chlortoluron), (chlorsulfuron), (dazomet), (decanol), (DCPA), (desmedipham), (desmetrine), (devrinol), (dicamba), (dichlobenil), (dichlorprop), (dichlofop), (diclosulam), (difenzoquat), (diflufenican), (diflufenzopyr), (dimefuron), (dimethenamid), (dinoterb), (diquat), (dithiopyr), (diuron), (diuron+glyphosate), (diuron+hexazinone), (diuron+MSMA), (diuron+paraquat), (diuron+sulfentrazone), (diuron+thidiazuron), (diuron+tebuthiuron), (DSMA), (endotal), (EPTC), (esprocarb), ethalfluralin), (ethametsulfuron), (ethephon), (ethephon+cyclanilide), (ethephon+glufosinate ammonium salt), (ethofumesate), (ethoxysulfuron), (phenmedipham), (fenoxaprop-p-ethyl), (fentrazamid), (flazasulfuron), (floransulam), (fluazifop-p-butyl), (fluazifop-p-butyl+fomesafen), (flucarbazone sodium), (flufenacet), (flufenpyr-ethyl), (flumetralin), (flumetsulam), (flumiclorac-pentyl), (flumioxazin), (fluometuron), (fluoroglycofen), (flupyrsulfuron-methyl sodium), (Flurochloridone), (fluridone), (fluroxypyr-methyl), (fluroxypyr-methyl+picloram), (fluroxypyr-methyl+triclopyr-butolyl), (flutarmone), (fluthiacet-methyl), (fomesafen), (foramsulfuron), (foramsulfuron+iodosylfuron-methyl), (Fosamine), (glyphosate), (glyphosate+2,4-D), (glyphosate+carfentrazone-ethyl), (glyphosate+simazine), (glufosinate-ammonium salt), (halosulfuron-methyl), (haloxyfop-p-methyl), (hexazinone), (hexazinone+sulfometuron-methyl), (maleic hydrazine), (Imazamethabenz), (imazamox), (imazapic), (imazapic+imazapyr), (imazapix+imazethapyr), (imazapyr), (imazaquin), (imazaquin+glyphosate), (imazaquin+imazethapyr+pendimethalin), (imazetapir), (imazetapir+flumioxazine), (imazetapir+glyphosate), (indaziflam), (indaziflam+isoxaflutole), (indaziflam+metribuzim), (iodossulfuron-methyl), (isoproturon), (isoxaben), (isoxaflutole), (isoxazole), (isoxazolidinone), (lactofen), (linuron), (mecoprop), (MCPA), (MCPB), (mefenacet), (mesosulfuron), (mesotrione), (metamitron), (metazachlor), (metam), (methylcyclopropene), (methylbenzuron), (metolachlor), (metolachlor+glyphosate), (Metoxuron), (metribuzin), (metsulfuron-methyl), (molinate), (monolinuron), (MSMA), (napropamide), (naptalam), (nicosulfuron), (norflurazon), (ioxynil octanoate), (oryzalin), (orthosulfamuron), (oxadiazone), (oxadiargyl), (oxyfluorfen), (paclobutrazol), (paraquat), (pebulate), (pendimethalin), (penoxsulam), (picloram), (Picolinafen), (pyraflufen-ethyl), (Pyrazolinate), (pyrazosulfuron-ethyl), (pyrazole), (pyrazome), (pyrazoxifen), (pyribenzoxim), (pyrithiobac-sodium), (pyroxsulam), (pretilachlor), (primisulfuron), (prodiamine), (profoxydim), (prohexadione), (prometone), (promethrin), (pronamide), (propachlor), (propanyl), (propanyl+triclopyr-butotyl), (propaquizafop), (propazine), (propoxicarbazone), (propisochlor), (prosulfocarb), (prosulfuron), (pyrazon), (quinclorac), (quizalofop-p-ethyl), (quizalofop-p-tefuryl), (rimsulfuron), (s-metolachlor), (s-metolachlor+glyphosate), (saflufenacil), (sethoxydim), (siduron), (simazine), (simethrin), (sulcotrione), (sulfentrazone), (sulfentrazone+tebuthiuron), (sulfometuron-methyl), (sulfosulfuron), (terbumtan), (tebuthiuron), (tebuthiuron+flazasulfuron), (tembotrione), (tepraloxydim), (terbacil), (terbuthylazine), (tenilchlor), (thidiazuron), (thiazopyr), (thifensulfuron), (thiobencarb), (tralcoxidim), (triallate), (triasulfuron), (tribenuron), (triclopyr-butotyl), (triclopyr-butotyl+picloram), (trietazine), (trifloxysulfuron-sodium), (trifluralin), (triflusulfuron), (trinexapac-ethyl), or (vernolate).

7. The blend of claim 4, wherein the blend is a solid blend 1, characterized by the formula Bs=((X+Y1+Y2+Z1+Z2)+Z3), wherein:

Bs represents the solid blend;

Z1 represents an inorganic pigment or dye, selected from iron oxide, titanium oxide and Prussian blue, or an organic dye selected from alizarin dyes, azo dyes and metal phthalocyanine dyes;

Z2 represents a screening nutrient selected from iron, manganese, boron, copper, cobalt, molybdenum, and zinc salts; and Z3 represents an adherent coating selected from carboxymethylcellulose, a natural polymer, a synthetic polymer, latex, gum arabic, polyvinyl alcohol, polyvinyl acetate, or a phospholipid.

8. The blend of claim 4, wherein the blend is a liquid blend characterized by formula $Bl=(((W1)+(W2)+(W3)+(W4))+((X)+(Y1)+(Y2)))$, wherein:

Bl represents the liquid blend;

W1 represents a stabilizing agent;

W2 represents a diluent selected from a water-immiscible non-polar solvent (W21), an aprotic solvent (W22), or a polar organic solvent blended with aprotic water;

W3 represent an adjuvant selected from surfactants, crop oils, fertilizers, dispersants, compatibility agents, foaming agents, anti-foams, correctives, spraying dyes, and combinations thereof; and W4 represents an inorganic pigment or dye selected from iron oxide, titanium oxide and Prussian blue; an organic dye selected from alizarin dyes, azo dyes and metal phthalocyanine dyes; or a screening nutrient selected from iron, manganese, boron, copper, cobalt, molybdenum and zinc salts.

\* \* \* \* \*